United States Patent [19]

Spock et al.

[11] Patent Number: 4,639,885
[45] Date of Patent: Jan. 27, 1987

[54] EMI SUPPRESSION FOR ELECTRONIC ENGINE CONTROL FREQUENCY SIGNAL INPUTS

[75] Inventors: Wayne R. Spock, Canton; Richard P. Meisner, Glastonbury, both of Conn.

[73] Assignee: United Technologies Corporation, Hartford, Conn.

[21] Appl. No.: 686,064

[22] Filed: Dec. 24, 1984

[51] Int. Cl.$^4$ ............................................. H04B 15/00
[52] U.S. Cl. .................................... 364/574; 364/572; 375/58; 371/25
[58] Field of Search ................... 364/572, 574; 371/25; 375/55, 57, 58

[56] References Cited

U.S. PATENT DOCUMENTS

| 3,303,335 | 2/1967 | Pryor | 364/572 |
| 3,391,344 | 7/1968 | Goldberg | 375/58 |
| 4,232,381 | 11/1980 | Rennick et al. | 364/574 |
| 4,270,809 | 6/1981 | Ohmori et al. | 371/25 |

Primary Examiner—Parshotam S. Lall
Attorney, Agent, or Firm—Dominic J. Chiantera

[57] ABSTRACT

Periodic digital signal samples of redundant sensed engine RPM signals are rejected for limit exceedance of known performance values, the nonrejected digital signal samples are each compared with a synthesized RPM equivalent signal to further reject any sample which differs from the synthesized value by more than a selected difference value, one of the nonrejected samples are then used for the engine RPM indication, and in the event that both samples are rejected the synthesized value is used.

4 Claims, 3 Drawing Figures

EMI SUPPRESSION FOR ELECTRONIC ENGINE CONTROL FREQUENCY SIGNAL INPUTS

TECHNICAL FIELD

This invention relates to electronic engine controls (EECs) for gas turbine engines, and more particularly to circuitry for EMI suppression of EEC frequency signals.

BACKGROUND ART

As known, EECs are used to electronically control operation of gas turbine engines based on selected control algorithms executed by the EEC. The EEC applies the control algorithms to sensed engine parameters received in the form of electrical signals to provide electrical control signals to electro-mechanical interfaces, such as position controlled actuators, which position various engine valves, vanes, etc. to regulate engine performance. To ensure reliability the EEC includes dual redundant control circuitry, i.e. primary and secondary control channels. The sensed engine parameter signals are also redundant. Each parameter has duplicate sensed signal inputs to each of the channels of the EEC. These sensed parameter signals include analog amplitude and analog frequency signal formats, as well as digital.

Digital electronic engine controls (DEEC) use digital signal processing to apply the control algorithms to the sensed parameter signals. For the analog sensed signal formats this requires analog-to-digital (A/D) conversion, all of which is well known. Since A/D conversion is sensitive to spurious noise associated with the analog signal, such as electromagnetic interference (EMI), it is also known to provide the DEEC with input selection logic. This logic selects the best signal from among the two actual sensed parameter signals and an idealized, synthesized parameter signal which acts as referee.

The most critical gas turbine engine parameters are rotor speed; both $N_1$, $N_2$. Each are sensed as frequency signals; typically the position of a ring gear mounted to the shaft is sensed by duplicate magnetic pick-ups which provide redundant cyclic signals ($N_A$, $N_B$) whose frequency is indicative of angular velocity. The DEEC converts the frequency signals to digital signals representative of engine RPM. However, these frequency signals are susceptible to lightning induced transients, or EMI, which results in erroneous frequency-to-digital conversion which affect RPM accuracy and cause unwantd control response. Although electrical shielding on the sensor lines may be used, the cost and weight may be prohibitive due to the number of sensors and the wire lengths.

DISCLOSURE OF INVENTION

The object of the present invention is to provide DEEC noise discrimination selection circuitry for EMI suppression of frequency type sensed signals.

According to the present invention, periodic digital signal samples of each of the redundant sensed frequency signals are tested for limit exceedance of known performance values and rejected in the presence of an exceedance, the nonrejected digital signal samples are each compared with a synthesized RPM equivalent signal to further reject any sample which differs from the synthesized value by more than a selected difference value, one of the nonrejected samples are then used for the engine RPM indication, and in the event that both samples are rejected the synthesized value is used. In further accord with the present invention, the performance value limit screening of the digital signal samples includes comparing each sample to selected high and low limits on the sample's acceptable amplitude value and to high and low limits on the acceptable rate of change of the sample amplitude value, the samples are rejected for exceedance of either performance value.

In still further accord with the present invention, each occurrence of a signal sample rejection for limit exceedance is recorded in register on a sample-by-sample basis and the parent sensed signal associated with the rejected sample is similarly rejected for use in response to the presence of a reoccurring sample rejection.

The noise discrimination selection circuitry of the present invention may be used with all frequency formatted input sensed signals. The use of limit exceedance criteria rejects any sample values corrupted by transient noise spikes, thereby ensuring more uniform engine control.

These and other objects, features, and advantages of the present invention will become more apparent in light of the following detailed description of a best mode embodiment thereof, as illustrated in the accompanying Drawing.

BRIEF DESCRIPTION OF DRAWING(S)

BEST MODE FOR CARRYING OUT THE INVENTION

Figure 1:
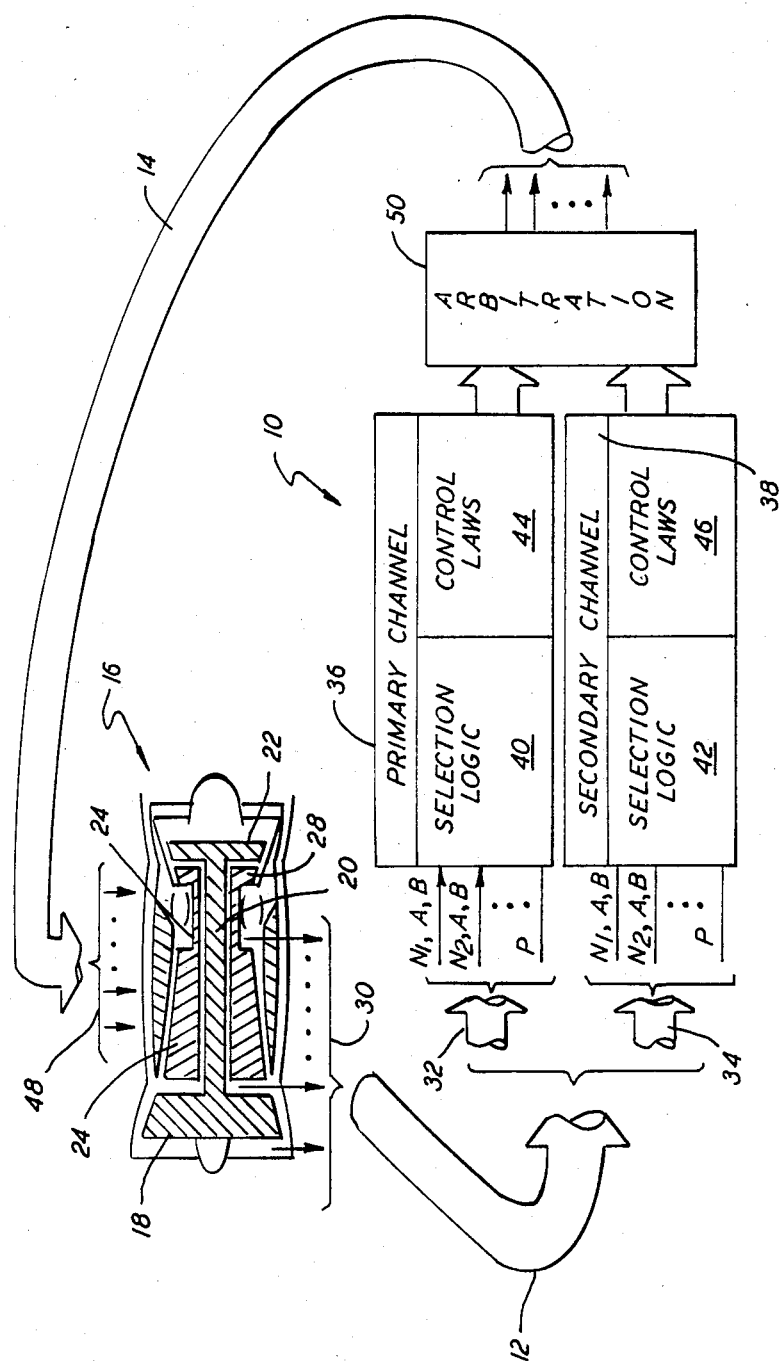
FIG. 1 is a conceptual illustration of an electronic engine control, which is used in the description of the present invention.

FIG. 1 is a conceptual illustration of a digital electronic engine control (DEEC) 10, connected through sensor lines 12 and control lines 14 to a gas turbine engine 16. The engine shown is a twin spool turbofan engine with a low compressor 18 driven through shaft 20 by a low turbine 22, and a high compressor 24 driven through shaft 26 by a high turbine 28. However, it should be understood that the present invention may be used with any configuration gas turbine engine.

The sensed engine parameters 30 include redundant frequency signals representative of the low turbine speed ($N_{1A}$, $N_{1B}$) and high turbine speed ($N_{2A}$, $N_{2B}$). The redundant (A, B) signals are presented through lines 12 to the inputs 32, 34 of each of a primary control channel 36 and secondary control channel 38 of the DEEC. Each channel receives both sensed frequency signals for each of the $N_1$, $N_2$ speeds.

In the conceptual illustration of FIG. 1, each DEEC channel is shown to have two major functional parts; a selection logic function 40, 42, and a control laws function 44, 46. The present invention is for use in the DEEC selection logic function to provide the best available sensed parameter signal to the control laws function. The control law algorithms are then applied to the selected signals to provide the engine control signal outputs 48. The control signals are provided through lines 14 from one of the two channels as determined by arbitration logic 50, all of which is known.

Figure 2A:
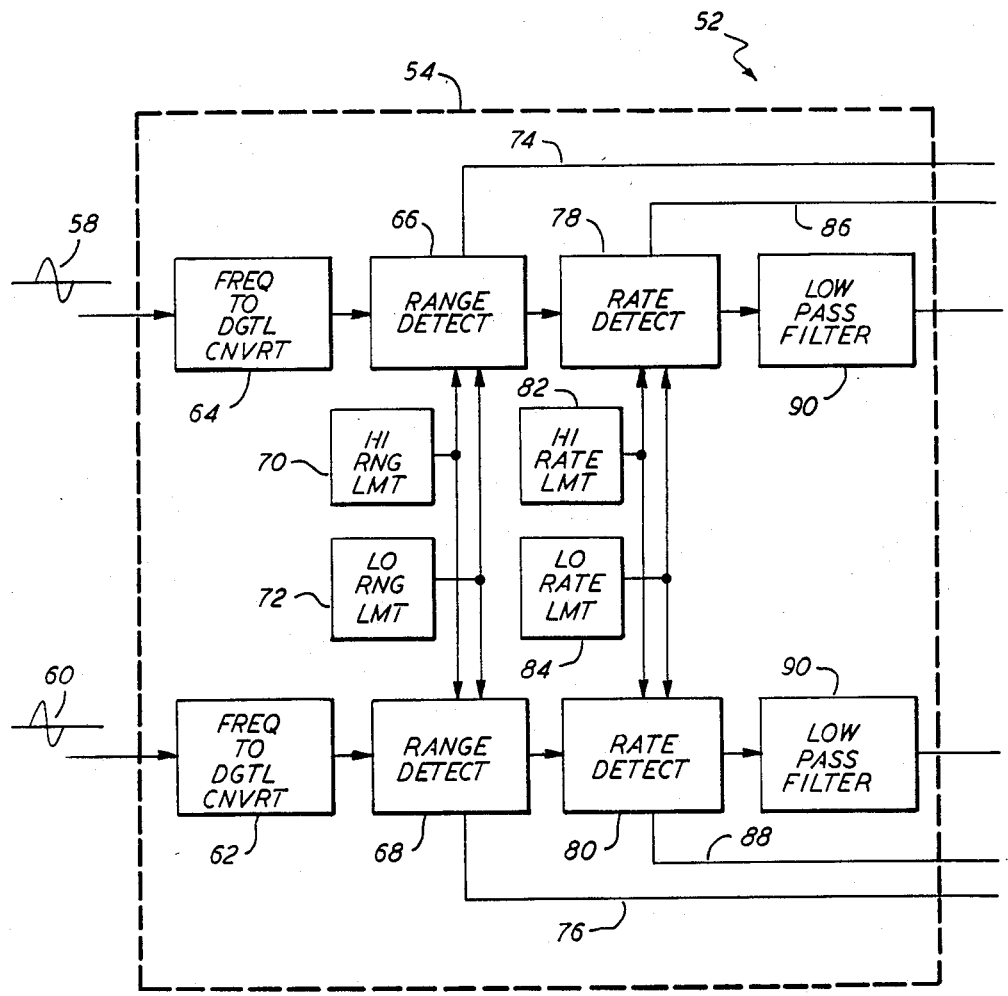
FIG. 2 is a simplified block diagram illustration of the noise discrimination and selection circuitry of the present invention.
Figure 2:
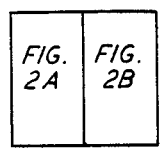
Figure 2B:
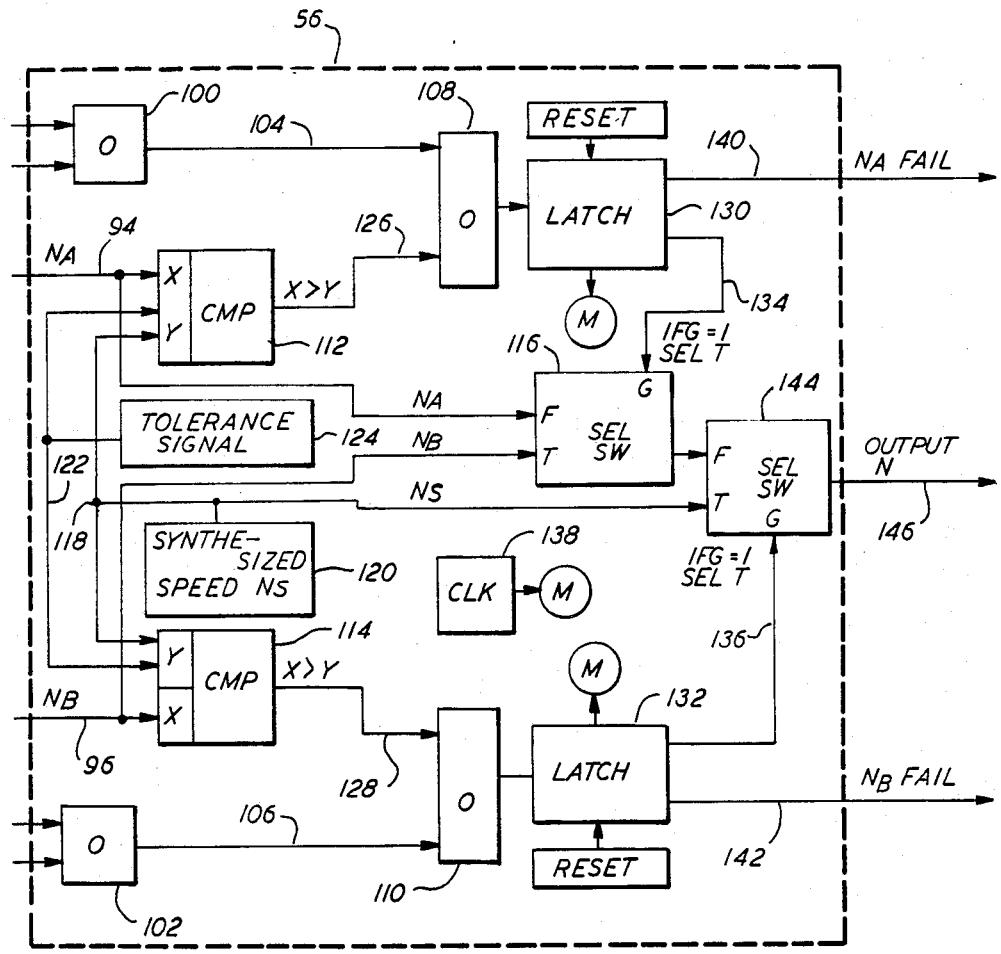

FIG. 2 is an illustration of the present invention noise suppression and selection circuitry 52 for use in each of the channels of the DEEC 10 of FIG. 1. It includes noise discrimination circuitry 54 and signal selection circuitry 56. The illustrated redundant sensed frequency signal inputs ($N_A$, $N_B$) 58, 60 are representative of generic engine turbine speeds received by each DEEC control channel. They may be either the redundant low turbine speed signals ($N_{1A}$, $N_{1B}$) or the high turbine speed signals ($N_{2A}$, $N_{2B}$). Each sensed speed signal frequency is converted through known frequency-to-digital converters (FDC) 62, 64 into a digital signal speed sample of one or more bytes.

The FDC counts the analog signal cross-overs to provide the digital speed equivalent. Any transient noise spikes carried by the frequency signals and resulting in spurious signal cross-overs will similarly be counted, resultng in an error count value. To screen out these error count samples, both sensed signal digital speed samples are compared to acceptable high and low limits of engine speed. If a sample exceeds these limits it is temporarily rejected.

In FIG. 2 the range detection circuits 66, 68 compare the sample speed count to high and low speed count limits 70, 72. The range detection circuits, which may be discrete component comparators or alternatively may be executed in software in each DEEC channel signal processor, set a discrete range fail signal on associated lines 74, 76 in response to a sample speed count value exceeding the speed count limits.

Following range detection the redundant samples are compared to acceptable limits on rate of change of engine speed, i.e. acceleration. This is provided by rate detection circuitry 78, 80 which determine the difference value between succeeding sample time interval count values to determine the rate of change, and compares the calculated rate to the high and low rate of change limits 82, 84 indicative of acceptable min/max limits on engine acceleration. Any sample value exceedance of rate causes the rate detectors to set discrete rate fail signals on lines 86, 88, in which event the particular input signal is temporarily rejected from use.

The redundant samples are filtered through high pass digital filters 90, 92, and the filtered samples are provided on lines 94, 96 from the noise discrimination function circuitry to the selection logic circuitry 56. The filter time constant is selectable based on the range of permissible engine speeds. The filters and rate detectors may also be discrete components or functionally embodied in software in the DEEC channel signal processor. Similarly, the range fail signals on lines 74, 76 and rate fail signals on lines 86, 88 are also presented to the selection logic circuitry.

Figure 3:
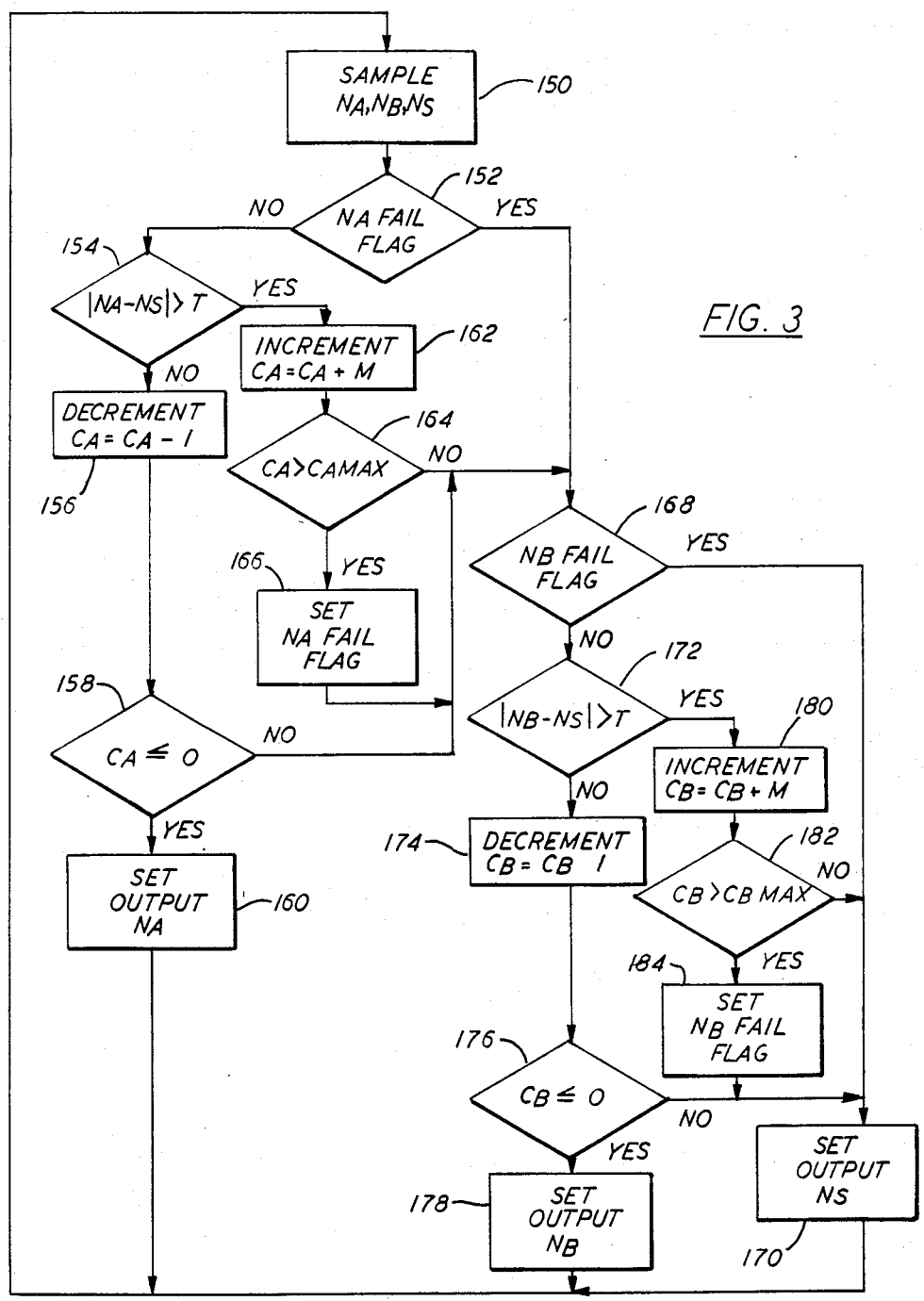
FIG. 3 is a flowchart diagram illustrating the steps of the selection algorithm performed by the circuitry of FIG. 2.

The selection logic circuitry is shown in diagrammatic form with the signal processing steps shown by discrete gate circuitry, in combination with other discrete components. The diagrammatic format facilitates teaching of the selection logic algorithm, and is indicative of a best mode hardware embodiment. FIG. 3 is a flowchart diagram of the source code listing for the selection logic circuitry, as may be used in an alternative softwre embodiment where the selection logic algorithm may be executed in software by the DEEC channel signal processors.

In FIG. 2, the discrete fail signals on lines 74, 86 and on lines 76, 88 are received by associated OR (O) gates 100, 102 which couple both discretes through lines 104, 106 to the inputs of OR (O) gates 108, 110. The redundant digital samples ($N_A$, $N_B$) on the lines 94, 96 are each presented to one input (X) of related signal comparators 112, 114 and to the F and T inputs of select switch circuitry 116.

The comparators 112, 114 receive at a second input (Y) a synthesized speed signal ($N_S$) on lines 118 from speed synthesis circuitry 120, and a tolerance signal on line 122 from tolerance signal circuitry 124. The synthesized speed signal is provided in the well known manner of modeling the engine speed relationship to other sensed engine parameters and then calculating the synthesized speed based on the other actual sensed parameter values. Similarly, the tolerance signal circuitry may simply be a bias signal in the discrete component embodiment.

Each of the comparators provide a discrete high level logic state signal on output lines 126, 128 in response to the magnitude of the actual sensed digital speed sample being greater than the synthesized speed sample value by more than the tolerance signal magnitude. In other words, whenever the difference value between the actual sensed speed sample value and the synthesized value is greater than the tolerance value, the comparator provides a logic one output. Each comparator output is presented to a second input of each of the related OR gates 108, 110.

A logic high (True) fail signal on lines 104, 106 or a logic high comparative signal on lines 126, 128 are OR'ed through OR gates 108, 110 to the input of associated latch circuitry 130, 132. The latches keep an up-/down count of the occurrences of sample signal failures. Such latched sample failure results in a logic high (one) gate signal provided on the latch output lines 134, 136.

The up/down count is weighted. Typically each failure results in an up count of three and each good sample value is credited with a down count of one. It takes three consecutive good (non-failed) sample values to cancel each bad (failed) sample. Therefore, the presence of a positive count generally indicates the presence of bad sample values. The bad samples need not be consistent, merely more frequent than one-in-three.

The clock 138 provides a signal (M) indicative of the maximum lapsed time interval in which either latch may have a consistently positive count value. In the event of a "time out" in which either latch count is consistently positive for the maximum lapsed time, the latches 130, 132 provide a logic high (one) discrete on associatd lines 140 "$N_A$ FAIL" and 142 "$N_B$ FAIL". The presence of either discrete means that the related one of the redundant signal samples is considered permanently bad. It is not used for the remainder of the flight profile. This is in contrast to the logic one discrete appearing on latch output lines 134, 136 which prohibit selection of the bad sample value for the particular sample interval only.

The momentary latch signal on line 134 from latch 130 determines which of the two speed sample values ($N_A$, $N_B$) at the input to select switch 116 are selected for coupling through to a second select switch 144. The switch 144 receives as a gate signal the momentary latch signal on line 136 from latch 132 and also receives at a second input thereof, the $N_S$ synthesized signal.

In the event of both good samples, the lines 134, 136 are low (zero), selecting $N_A$ as the "N output" RPM value on output line 146. If $N_A$ is bad and $N_B$ is good, $N_B$ is selected for the output. If both $N_A$ and $N_B$ are bad the $N_S$ synthesized value is selected.

The selection logic circuitry 56 of FIG. 2 may be embodied in discrete component hardware. As an alternative the selection logic function may be performed in software by the signal processors in each channel of the DEEC. FIG. 3 is a flowchart of the source code listing for performing the selection logic function in software, by the DEEC signal processors. As shown, the selection routine begins with instructions 150 which request the sampling of the two actual sample values $N_A$, $N_B$, and the synthesized value $N_S$. Decision 152 determines if the "$N_A$ FAIL FLAG" is set. This is analogous to the discrete $N_A$ FAIL signal on line 140 of FIG. 2. If NO, meaning that the $N_A$ signal is not permanently failed, decision 154 determines if the difference value between the $N_A$ sample and the synthesized value is greater than the tolerance (T) signal value. If NO, instructions 156 decrement a A sample speed event counter ($C_A$) by one. This is the analogous function to that performed by the latch circuitry 130. Decision 158 determiens if the count $C_A$ is equal to zero. If NO, the routine branches to the $N_B$ sample routine. If YES, indicating that all bad sample occurrences have been cleared, instructiohs 160 set the RPM output to the $N_A$ speed sample value, after which the routine branches back to instructions 150.

If the answer to decision 154 is YES (an out of tolerance condition for $N_A$), instructions 162 increment the sample counter by a M value. The M value is selectable, typically three as described hereinbefore with respect to the latch functions of FIG. 2. Decision 164 next determines if the event count value is greater than the maximum count value. This is analogous to the "time out" condition occurring with the latch circuitry 130. If YES, instructions 166 set the $N_A$ FAIL FLAG.

Following instructions 166, or a YES to decision 152, a NO to decision 164, and a NO to decision 158, decision 168 begins the same routine for the $N_B$ sample value. Decision 168 determines if the $N_B$ FAIL FLAG is set (analogous to a discrete $N_B$ FAIL signal on line 142, FIG. 2). If YES, instructions 170 set the RPM engine output to the synthesized $N_S$ value, after which the routine branches back to instructions 150. If NO, decision 172 determines if the difference value between the actual $N_B$ and synthesized $N_S$ value is greater than the tolerance value. If NO, instructions 174 decrement the corresponding $N_B$ sample event counter ($C_B$) by one. Decision 176 next determines if the $C_B$ event counter is less or equal to zero. If YES (indicating good B samples), instructions 178 set the RPM output to the $N_B$ value. If NO, indicating bad B samples, the routine executes instructions 170 setting the output to $N_S$.

In response to a YES from decision 172, instructions 180 increment the $C_B$ value by the M penalty count value (typically three) and decision 182 determines if the $C_B$ value is greater than the maximum. If NO, the routine executes instructions 170 setting the output to $N_S$. If YES, instructions 184 first set the $N_B$ FAIL FLAG value before setting the output to $N_S$.

Although the invention has been shown and described with respect to a best mode embodiment thereof, it should understood by those skilled in the art that various other changes, omissions, and additions in the form and detail thereof may be made therein without departing from the spirit and scope of the invention.

What is claimed:

1. Apparatus for use in digital electronic engine controls for selecting the best signal representation of a gas turbine engine parameter from among the sample values of two sensed signals representative of the parameter actual value, and a synthesized signal representative of the parameter nominal value, comprising:
    signal comparison means, responsive to the sampled values of each of the two sensed signals, for comparing each sample value to maximum and minimum performance value limits established for the parameter, and for rejecting those sensed signal samples which exceed these limits; and
    signal selection means, responsive to the nonrejected sensed signal samples from said signal comparison means
        for determining the difference signal magnitude between the sampled actual parameter value and the nominal value of the synthesized signal,
        for rejecting each previously nonrejected sensed signal sample having said difference value greater than a selected maximum,
        for selecting a nonrejected sensed signal sample as the parameter value in the presence of nonrejected samples, and
        for selecting the synthesized signal as the parameter value in the absence of nonrejected sensed signal samples.

2. The apparatus of claim 1, wherein said signal comparison means includes:
    magnitude comparator means, responsive to each of the sensed signal samples,
        for comparing each sample magnitude to maximum and minimum magnitude limits established for the parameter, and
        for rejecting each sample value having a magnitude outside of these magnitude limits.

3. The apparatus of claim 1, wherein said signal comparison means includes:
    rate comparator means, responsive to successive sample values of each of the sensed signals,
        for determining the rate of change in succeeding sample values,
        for comparing the determined rate of change for each sample of each sensed signal with maximum and minimum rate of change limits established for the parameter, and
        for rejecting each sample value having a rate of change outside of these rate of change limits.

4. The apparatus of claim 1, wherein said signal selection means further comprises:
    counting means, responsive to consecutive rejected and nonrejected samples of each of said sensed signals,
    counting means, responsive to consecutive rejected and nonrejected samples of each of said sensed signals,
        for identifying each occurrence of a rejected sample value as a plural count and for identifying each occurrence of a nonrejected sample as a single count,
        for providing a sum count signal by adding said plural count rejections and subtracting said single count nonrejections, and
        for rejecting from use for an extended interval any one of said sensed signals with a sample sum count signal having a sum greater than zero for a selected period of time.

* * * * *